(12) United States Patent
Yeh et al.

(10) Patent No.: US 7,801,947 B2
(45) Date of Patent: Sep. 21, 2010

(54) SOFTWARE DEPLOYMENT SYSTEM AND METHOD

(75) Inventors: Fu-Kun Yeh, Tainan (TW); Ting-Yuan Huang, Tainan (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 1087 days.

(21) Appl. No.: 11/023,753

(22) Filed: Dec. 28, 2004

(65) Prior Publication Data

US 2006/0143599 A1 Jun. 29, 2006

(51) Int. Cl.
*G06F 15/16* (2006.01)
(52) U.S. Cl. .................. 709/203; 709/219; 717/168; 717/169; 717/170; 717/171; 717/172; 717/173; 717/174; 717/175; 717/176; 717/177; 717/178
(58) Field of Classification Search .......... 709/203, 709/219; 717/168–178
See application file for complete search history.

(56) References Cited

U.S. PATENT DOCUMENTS

| | | | | |
|---|---|---|---|---|
| 6,738,801 | B1 * | 5/2004 | Kawaguchi et al. | 709/208 |
| 7,089,548 | B2 * | 8/2006 | Lin | 717/168 |
| 7,107,345 | B2 * | 9/2006 | Chae | 709/227 |
| 2004/0031029 | A1 * | 2/2004 | Lee et al. | 717/171 |
| 2004/0073912 | A1 * | 4/2004 | Meza | 719/321 |
| 2006/0031420 | A1 * | 2/2006 | Ferguson et al. | 709/219 |
| 2006/0106806 | A1 * | 5/2006 | Sperling et al. | 707/10 |
| 2006/0168340 | A1 * | 7/2006 | Heller et al. | 709/242 |

FOREIGN PATENT DOCUMENTS

| | | |
|---|---|---|
| TW | 495675 | 7/2002 |
| TW | I225217 | 12/2004 |
| WO | WO02056198 | 7/2002 |

OTHER PUBLICATIONS

TW Office Action mailed Dec. 10, 2007.

* cited by examiner

*Primary Examiner*—Duyen M Doan
(74) *Attorney, Agent, or Firm*—Thomas, Kayden, Horstemeyer & Risley

(57) ABSTRACT

A software deployment system and method are provided. The system includes a server and at least one client. The server executes a first server application and a second server application simultaneously. The client controls at least one equipment tool, executes a first client application connected to the first server application, and has a second client application. In response to a deployment signal, the client first deletes the first client application and executes the second client application to connect to the second server application if all equipment tools controlled by the client are idle. The client then transmits a completion signal to the server. If software deployment on each client is complete, the server deletes the first server application.

18 Claims, 3 Drawing Sheets

SOFTWARE DEPLOYMENT SYSTEM AND METHOD

BACKGROUND

The present invention relates to software deployment, and particularly to a software deployment system and method for upgrading software without interrupting normal operations.

In the client-server model, clients interact with applications on a server. If an enterprise has a large number of clients requiring synchronous connection with a server, application (software) upgrades on both the server and the clients is complicated.

In product manufacturing, CIM (Computer Integrated Manufacturing) systems plan manufacturing schedules and provide information required by the process. CIM systems have a three-tier architecture including a database, a server and clients. Each client receives related manufacturing information from the server, and controls equipment tools accordingly. During manufacturing, the CIM system supports a large number of clients simultaneously connecting to the server in real time. When an upgrade of the CIM system is required, the new software must be deployed to both the server and the clients, necessitating suspension thereof.

Conventionally, IT (Information Technology) engineers enter the plant and manually restart and download the software to upgrade each computer from a file server. This method is inefficient and time-consuming. Since the CIM system is suspended during software upgrade, equipment tools are halted resulting in held lots (products) and down time for each tool. The held lots must then be recovered after the CIM system upgrade. Additionally, since several computers must download new software from the file server simultaneously, peak request overloads may crash the file server.

SUMMARY

The present invention is proposed to address the aforementioned issues.

Accordingly, it is an object of the present invention to provide a software deployment system and method for upgrading software without interrupting normal operations between the clients and the server.

To achieve the above object, the present invention provides a software deployment system. The system includes a server and at least one client. The server executes a first server application and a second server application simultaneously. The client controls at least one equipment tool, executes a first client application connected to the first server application, and has a second client application.

The server transmits a deployment signal to the client. In response to the deployment signal, the client first deletes the first client application and executes the second client application to connect to the second server application if all of the equipment tools controlled by the client are idle. The client then transmits a completion signal to the server. If completion signals are received from all clients, the server deletes the first server application.

The client determines whether the first equipment tool is idle by retrieving equipment information from the equipment tool. The equipment information records if the equipment tool is idle or not and the length of time the equipment tool will be idle.

According to another embodiment, a software deployment method is provided. First, at least one client is provided. The client controls at least one equipment tool, executes a first client application connected to a first server application, and has a second client application. The second client application is then executed to connect with a second server application if all of the equipment tools controlled by the client are idle. The first and second server applications are executed on a server simultaneously.

Additionally, the client further deletes the first client application before the second client application is executed, and the server deletes the first server application if software deployment for each client is complete.

The above-mentioned method may take the form of program code embodied in tangible media. When the program code is loaded into and executed by a machine, the machine becomes an apparatus for practicing the invention.

BRIEF DESCRIPTION OF THE DRAWINGS

The aforementioned objects, features and advantages of this invention will become apparent by referring to the following detailed description of the preferred embodiment with reference to the accompanying drawings, wherein.

DESCRIPTION

The present invention provides a system and method overcoming conventional software upgrade and deployment problems.

Figure 1:
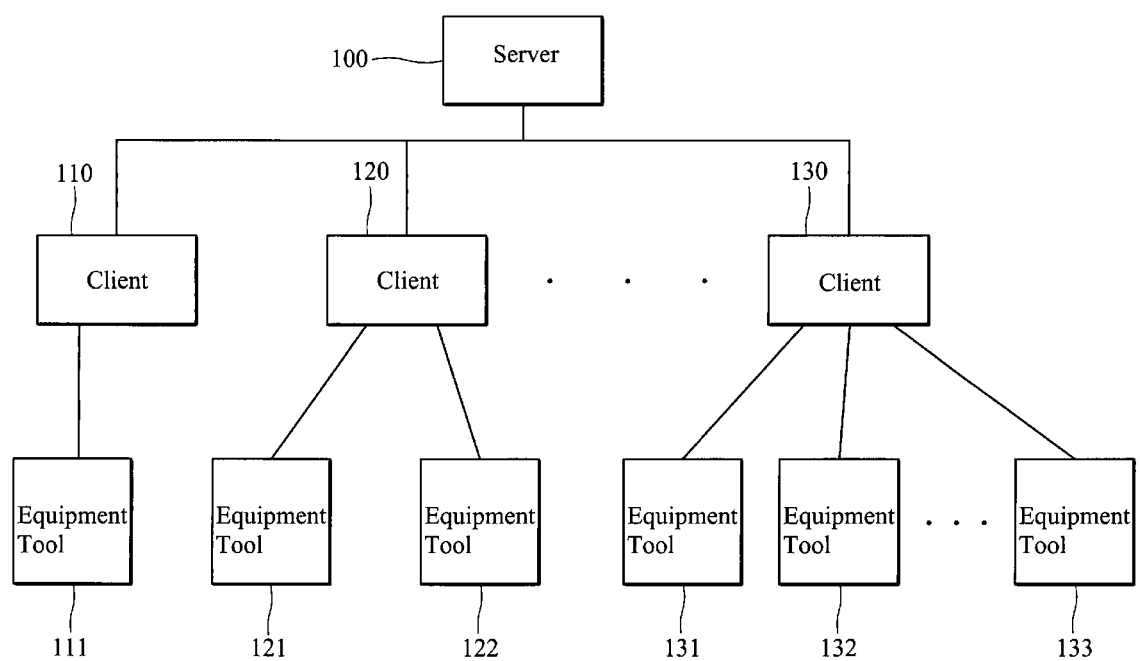
FIG. 1 is a schematic diagram illustrating the architecture of the software deployment system according to the present invention.

FIG. 1 illustrates the architecture of the software deployment system according to the present invention.

The system includes a server 100 and a plurality of clients 110, 120 and 130, and a database (not shown) storing manufacturing information. It is understood that the database may be at any location, such as inside the server 100. The server may provide manufacturing information to the clients through a server application executed thereon. Each client controls at least one equipment tool. In this case, client 110 controls equipment tool 111, client 120 controls equipment tools 121 and 122, and client 130 controls equipment tools 131~133.

The client executes a client application connecting to the server application to receive manufacturing information therefrom in real time, and provides manufacturing information to the equipment tool, enabling manufacture of products based on the manufacturing information. The client can retrieve equipment information about the equipment tool via a run manager (not shown), in which the equipment information records whether corresponding equipment tool is idle or not and the length of time the equipment tool will be idle.

Figure 2:
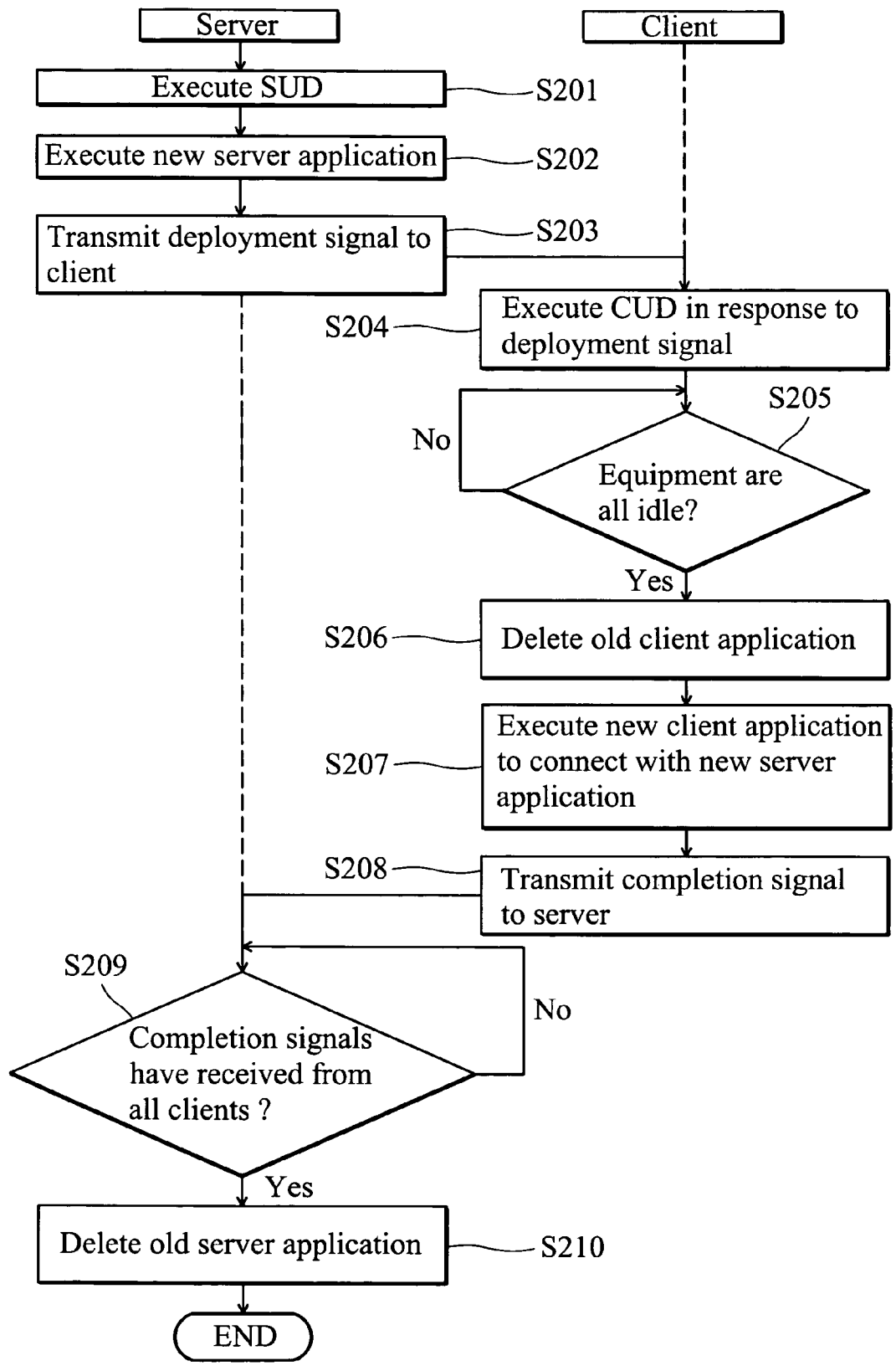
FIG. 2 is a flowchart showing the process of the software deployment method according to the present invention.

FIG. 2 shows the process of the software deployment method according to the present invention.

It is understood that each client runs the previous version of the client application and connects to the previous server application executed on the server. Prior to upgrade, new software is respectively stored into corresponding hosts in advance, that is, a new server application is stored on the server, and a new client application corresponding to the new server application is stored on each client.

First, in step S201, the server executes a Server Upgrade Daemon (SUD). Thereafter, in step S202, the SUD directs the server to execute the new server application, and in step S203, transmits a deployment signal to each client. At this time, the previous and upgraded server applications coexist on the server.

After receiving the deployment signal, in step S204, the client executes a Client Upgrade Daemon (CUD) in response to the signal. In step S205, the CUD determines whether all of the equipment tools controlled by the client are idle. It is understood that CUD determines whether each equipment tool is idle by retrieving equipment information from a Run Manager (RM) for the equipment tool, in which each equipment tool has one corresponding RM. The equipment information records whether corresponding equipment tool is idle or not and/or the length of time for the equipment tool will be idle (wait time). If the client controls several equipment tools, not all of which are idle at one time (No in step S205), the CUD calculates a maximum wait time using the wait time of each equipment tool, and determines whether all of the equipment tools are idle again after the maximum wait time has elapsed (S205).

If yes (Yes in step S205), in step S206, the CUD triggers the client to delete the old client application. Thereafter, in step S207, the CUD triggers the client to execute the new client application, such that the new client application connects to the new server application, and in step S208, transmit a completion signal to the server. It is understood that the CUD terminates itself after the completion signal is transmitted to the server. It is understood that if several connections are allowable between the client and server, or the terminated old client applications may coexist with the new one, step S206 may be omitted.

In step S209, SUD determines whether completion signals have been received from all clients. That is, it is determined whether or not software deployment for each client is complete. If not (No in step S209), the flow stays at step S209. If yes (Yes in step S209), in step S210, the server deletes the old server application. Similarly, the SUD terminates itself after software upgrade is complete.

Figure 3:
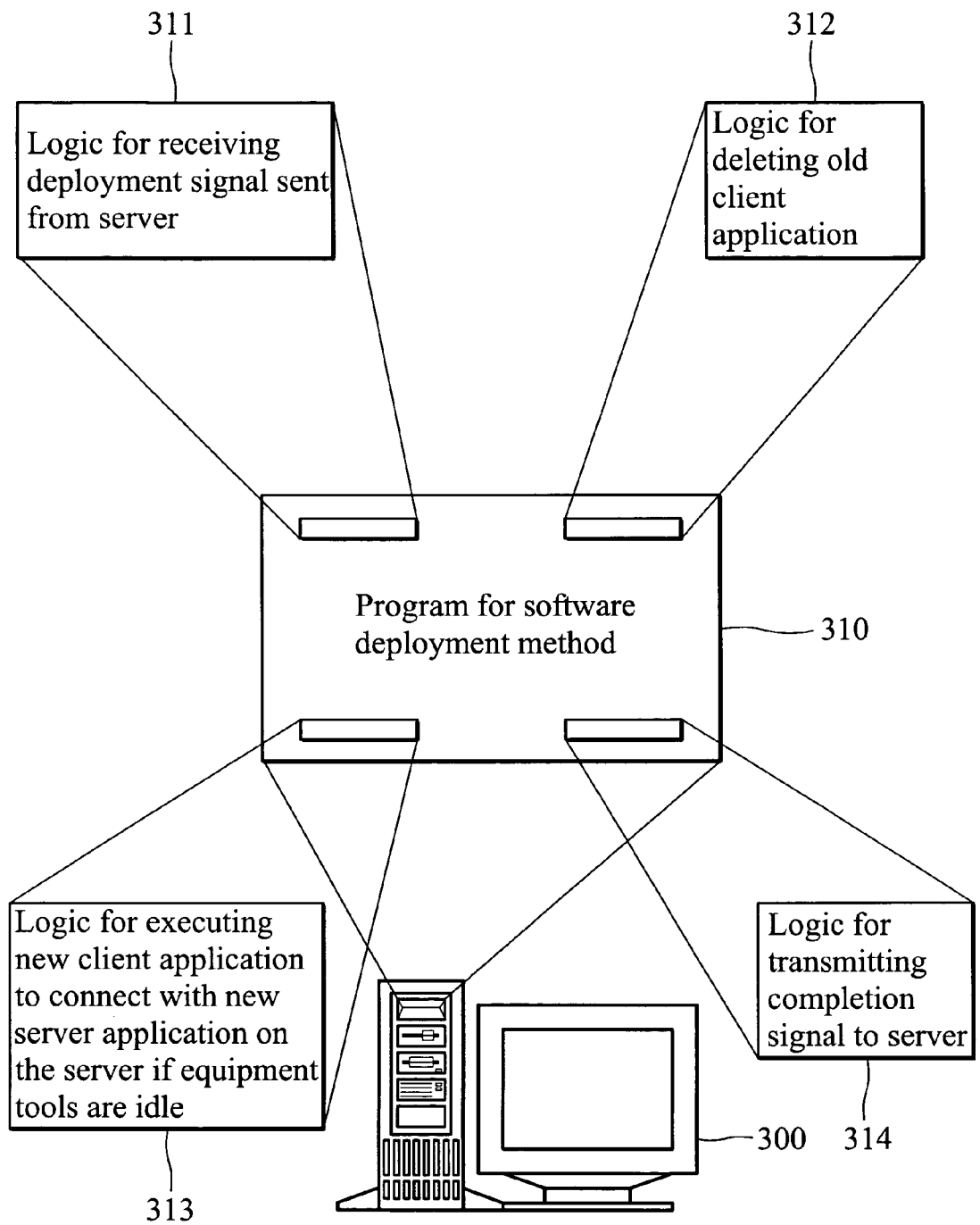
FIG. 3 is a schematic diagram illustrating a storage medium storing a computer program for execution of the software deployment method according to the present invention.

FIG. 3 is a diagram of a storage medium storing a computer program providing the software deployment method according to the present invention. The computer program product comprises a storage medium 310 having computer readable program code embodied in the medium for use in a computer system 300, the computer readable program code comprises at least computer readable program code 311 receiving a deployment signal sent from a server, computer readable program code 312 deleting an old client application on the computer system 300, computer readable program code 313 executing a new client application to connect with a new server application on the server if equipment tools controlled by the computer system 300 are idle, and computer readable program code 314 transmitting a completion signal to the server.

The present invention thus provides a software deployment system and method for automatic software upgrade without interruption of normal operations between clients and a server, thereby improving software upgrade efficiency, and reducing manpower. Additionally, no lots are held, and the utilization rate of each equipment tool can be increased.

The method and system of the present invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The method and systems of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to application specific logic circuits.

Although the present invention has been described in its preferred embodiments, it is not intended to limit the invention to the precise embodiments disclosed herein. Those skilled in this technology can still make various alterations and modifications without departing from the scope and spirit of this invention. Therefore, the scope of the present invention shall be defined and protected by the following claims and their equivalents.

What is claimed is:

1. A software deployment system, comprising:
a server having a first server application and a second server application, the second server application being a newer version application of the first server application to be upgraded; and
at least one client controlling a first equipment tool, wherein the first equipment tool has a run manager and an equipment information recording whether the first equipment tool is idle or not, and the at least one client having a first client application used to connect to the first server application and a second client application used to connect to the second server application, wherein the second client application being a newer version application of the first client application to be upgraded, and further the at least one client executes the first client application to connect with the first server application on the server, and receives information from the first server application to control operations of the first equipment tool according to the received information, the at least one client retrieves the equipment information from the run manager of the first equipment tool, determines whether the first equipment tool is idle or not according to the retrieved equipment information, and when the first equipment tool controlled by the client is idle, terminates the execution of the first client application, executes the second client application to connect with the second server application on the server, and receives information from the second server application to control operations of the first equipment tool according to the received information.

2. The system of claim 1 wherein the first and second server applications are executed simultaneously on the server.

3. The system of claim 2 wherein the client begins execution of the second client application in response to a deployment signal sent from the server.

4. The system of claim 2 wherein the client further transmits a completion signal to the server after the second client application is executed, and the server deletes the first server application in response to the completion signal.

5. The system of claim 1 wherein the client further controls a second equipment tool, and executes the second client application when both the first and second equipment tools are idle.

6. The system of claim 1 wherein the equipment information records whether the first equipment tool is idle or not.

7. The system of claim 1 wherein the equipment information records the length of time the first equipment will be idle.

8. The system of claim 1 wherein the client further deletes the first client application before the second client application has executed.

9. A method to deploy software, comprising the steps of:
providing at least one client comprising a first client application and a second client application, wherein the second client application being a newer version application of the first client application to be upgraded;
the client executing the first client application to connect with a first server application on a server, and receiving information from the first server application to control operations of a first equipment tool according to the received information, wherein the first equipment tool has a run manager, and has equipment information recording whether the first equipment tool is idle;
the client retrieving the equipment information from the rum manager of the first equipment tool, and determining whether the first equipment tool controlled by the client is idle according to the retrieved equipment information; and
when the first equipment tool controlled by the client is idle, the client terminating the execution of the first client application, executing the second client application to connect to a second server application on the server, and receiving information from the second server application to control operations of the first equipment tool according to the received information, wherein the second server application is a newer version application of the first server application to be upgraded.

10. The method of claim 9 wherein the first and second server applications are executed on the server simultaneously.

11. The method of claim 10 further comprising receiving a deployment signal sent from the server, and beginning execution of the second client application in response to the deployment signal from the server.

12. The method of claim 10 further comprising transmission of a completion signal to the server by the client after the second client application is executed, and deleting the first server application in response to the completion signal.

13. The method of claim 9 further comprising execution of the second client application by the client when both the first equipment tool and a second equipment tool are idle if the client further controls the second equipment tool.

14. The method of claim 9 wherein the equipment information records whether the first equipment tool is idle or not.

15. The method of claim 9 wherein the equipment information records the length of time for the first equipment tool will be idle.

16. The method of claim 9 further comprising deletion of the first client application by the client before the second client application has executed.

17. A software deployment system, comprising:
a server comprising a first server application and a second server application, wherein the second server application is a newer version application of the first server application to be upgraded; and
at least one client controlling operations of at least one equipment tool, wherein the first equipment tool has a run manager, and has equipment information recording whether the first equipment tool is idle, and the at least one client having a client application connected to the first server application on the server;
wherein the at least one client executes the client application, receives equipment information from the run manager of the equipment tool, determines whether the equipment tool controlled by the client is idle according to the received equipment information, and when the controlled equipment tool is idle, upgrades the client application and directs the upgraded client application to connect to the second server application.

18. The system of claim 17 wherein the client determines whether the equipment tool is idle by analyzing equipment information recording whether the equipment tool is idle or not and the length of time for the equipment tool will be idle.

* * * * *